United States Patent [19]
Scott

[11] Patent Number: 4,511,018
[45] Date of Patent: Apr. 16, 1985

[54] BICYCLE BRAKE MECHANISM

[76] Inventor: Edward Scott, S. Hwy. 75, P.O. Box 323, Ketchum, Id. 83340

[21] Appl. No.: 347,953

[22] Filed: Feb. 11, 1982

[51] Int. Cl.³ .............................................. B62L 1/12
[52] U.S. Cl. .................................. 188/24.12; 403/388; 403/408
[58] Field of Search ............... 188/24.11, 24.12, 24.13, 188/24.14, 24.15, 24.16, 24.17, 24.18, 24.19, 24.21, 24.22, 72.9; 280/264; 403/388, 408

[56] References Cited

U.S. PATENT DOCUMENTS

| | | | |
|---|---|---|---|
| 3,861,714 | 1/1975 | Evans et al. | 188/24.21 |
| 3,983,968 | 10/1976 | Weinmann | 188/24.22 |
| 4,009,768 | 3/1977 | Fujii | 188/24.22 |
| 4,013,144 | 3/1977 | Lauzier | 188/24.22 |
| 4,151,897 | 5/1979 | Schoch | 188/24.19 |
| 4,352,504 | 10/1982 | Pianalto | 188/24.22 |

FOREIGN PATENT DOCUMENTS

| | | | |
|---|---|---|---|
| 3020555 | 12/1981 | Fed. Rep. of Germany | 188/24.11 |
| 457180 | 4/1951 | Italy | 188/24.12 |
| 23349 | of 1902 | United Kingdom | 188/24.11 |
| 500024 | 2/1939 | United Kingdom | 188/24.21 |

OTHER PUBLICATIONS

DeLong's Guide to Bicycles and Bicycling, pp. 114 and 117.

Primary Examiner—Douglas C. Butler
Assistant Examiner—Richard R. Diefendorf
Attorney, Agent, or Firm—Shoemaker and Mattare, Ltd.

[57] ABSTRACT

The strength and rigidity of a bicycle brake mechanism is improved by adding a mounting post to an existing brake mechanism. The post has a surface area which is much larger than the surface area of a mounting bolt which extends through a fork crown and which tends to flex. The mounting bolt is accommodated in the mounting post, and the two elements have a rigidity and stability which is far increased over that of the mounting bolt alone.

6 Claims, 8 Drawing Figures

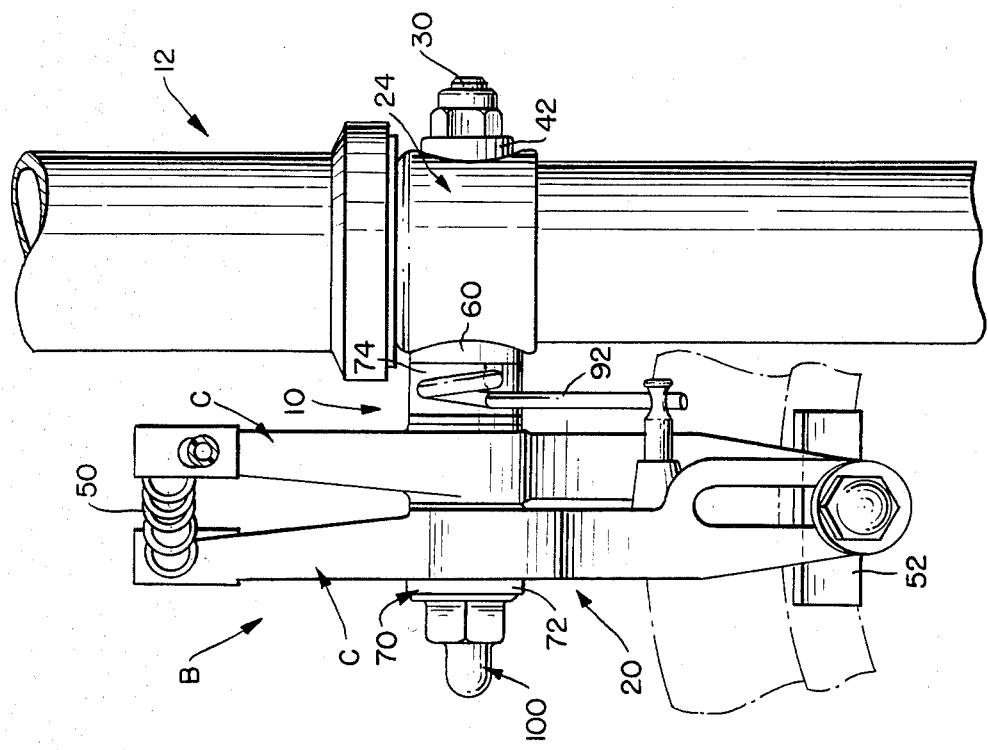
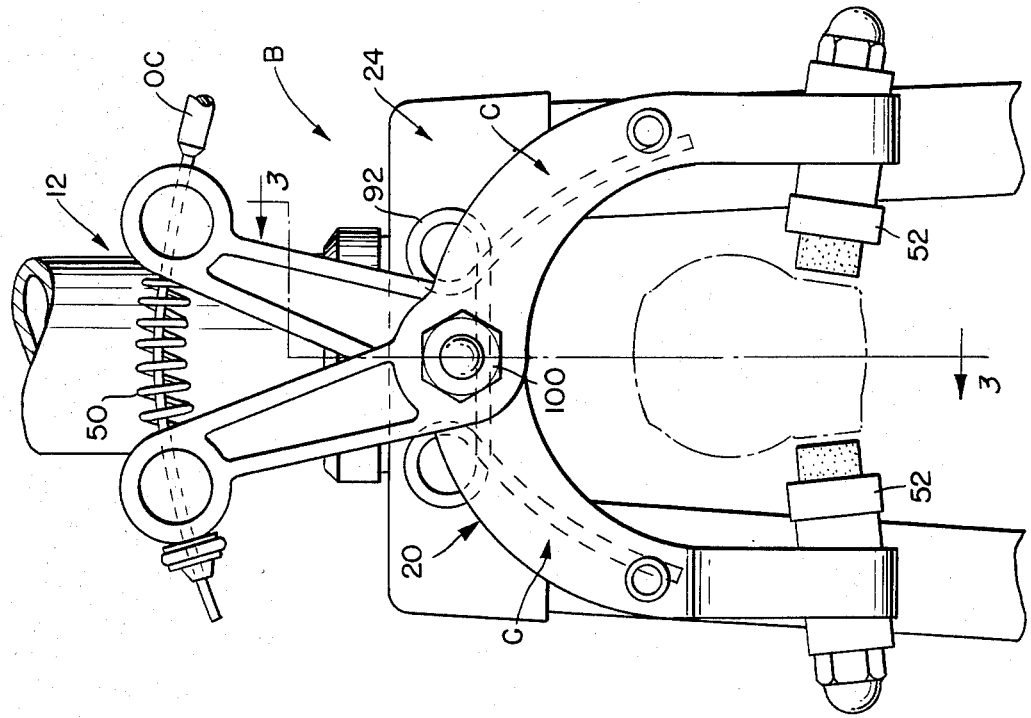

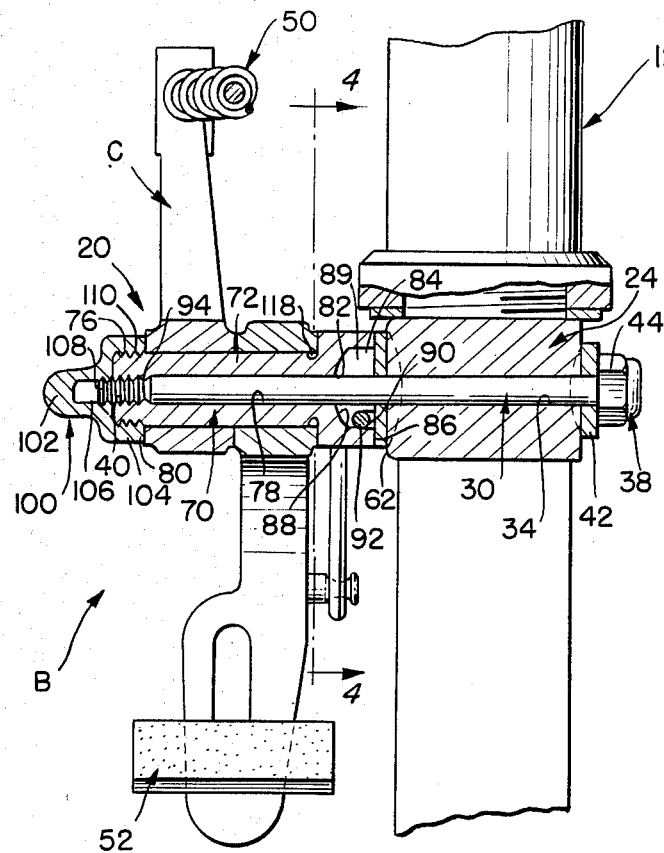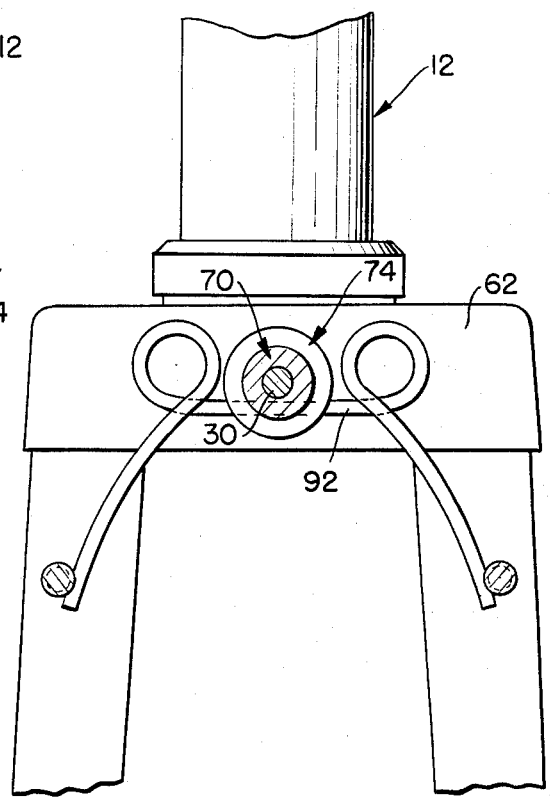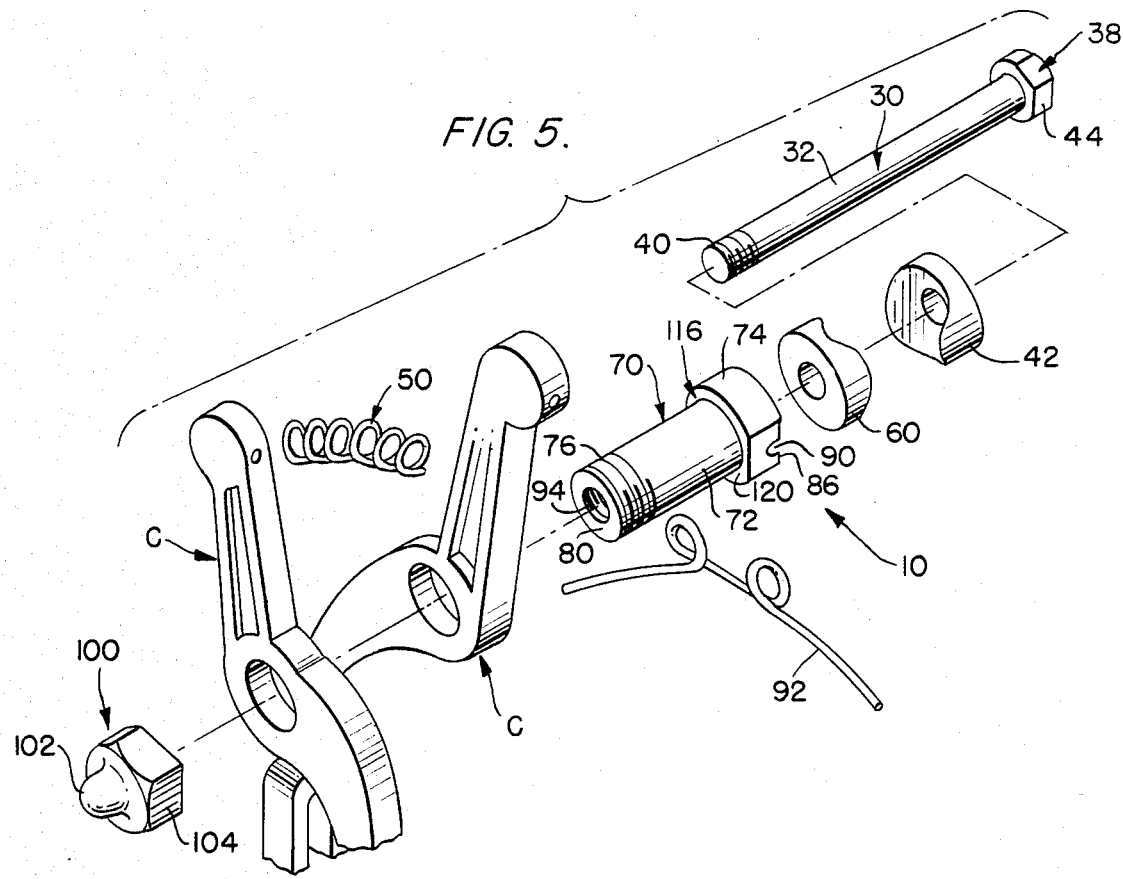

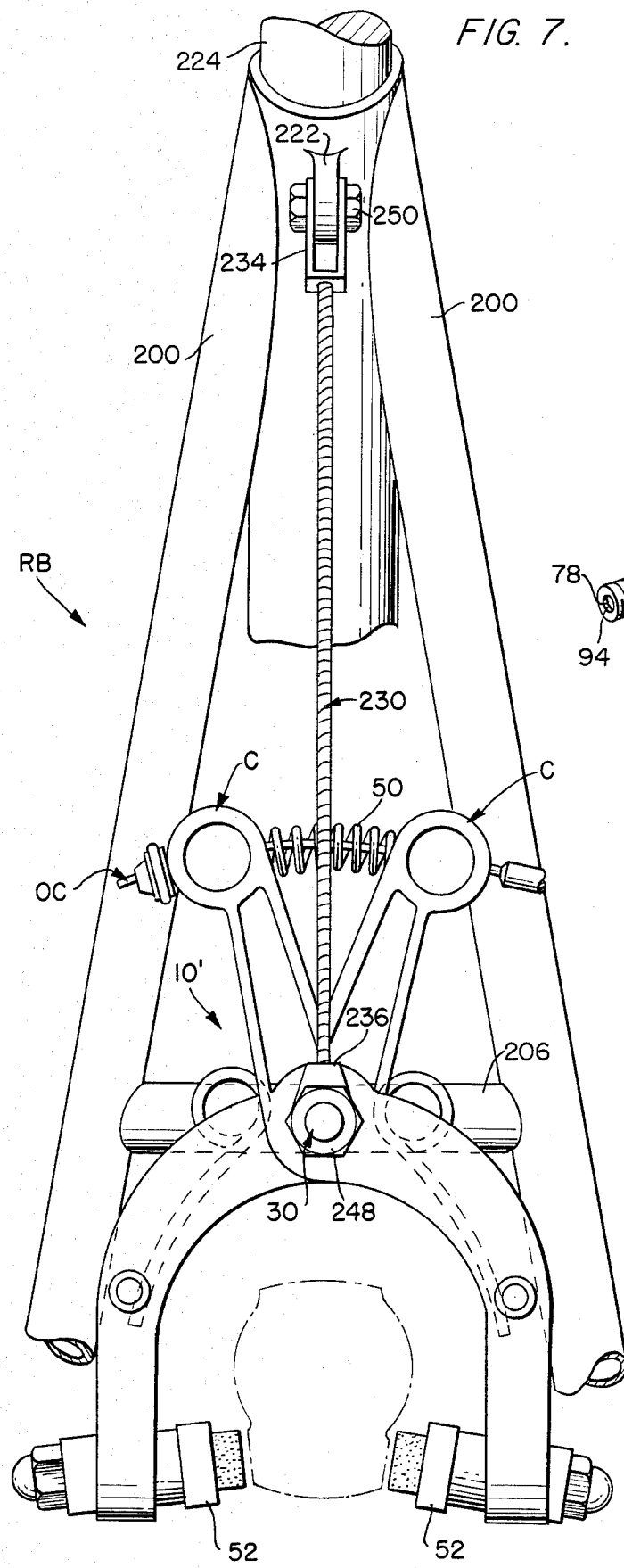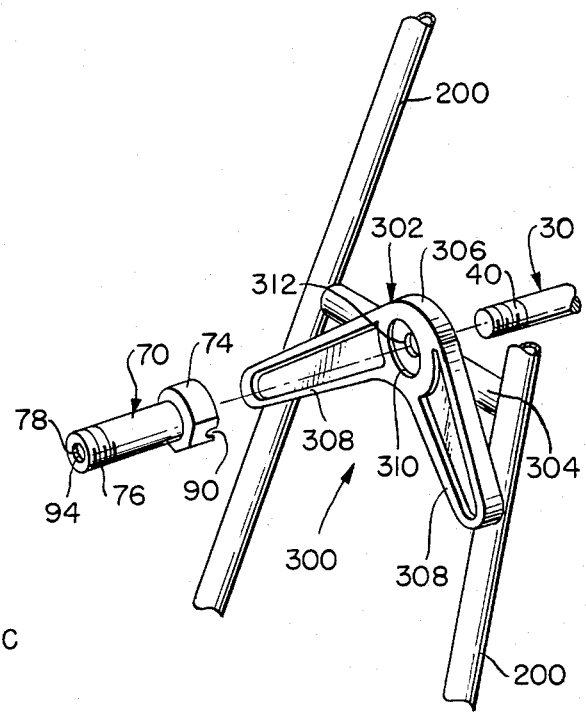

BICYCLE BRAKE MECHANISM

BACKGROUND OF THE INVENTION

The present invention relates in general to bicycles, and, more particularly, to bicycle brakes.

The problems and/or obstacles faced in the design and/or construction of bicycle brakes have been as follows:
1. Because a bicycle is human-propelled, extreme lightweight constuction is of paramount importance. This requirement applies to all parts of a bicycle, and thus also applies to the brake mechanism and to all parts of the bicycle to which the brakes are attached.
2. For a brake to function effectively, that brake must be quite rigid, resisting rather high forces that tend to bend or twist the brake parts.
3. To function efficiently, the brake should offer maximum retardation with minimum hand effort and minimum hand movement.
4. Because the design and construction of bicycles has become very standardized, and industry custom has been to provide component parts that are interchangeable among almost all bicycles, the design of brakes (or any other components) has been limited or restricted by having to fit onto existing bicycles.
5. In the case of caliper brakes, the mounting system includes a 6 millimeter diameter (0.236") bolt fitting through 6 mm (or slightly oversized) holes in the front fork and rear brake bridge.
6. In order to simplify construction, reduce the number of separate parts, and thereby lower costs, it has been customary to use the 6 mm bolts as the pivot bearings on side-pull type brakes (the type preferred by more critical cyclists). Such a small diameter bearing is necessarily less wear-resistant than a larger one would be, and more susceptible to stretching or elongation when used hard. Also, clearances are more critical.

These requirements conflict with one another, to the point of making a really efficient brake almost an impossibility. The 6 millimeter bolt, even though made of steel, is too flexible and flexes upward at the front wheel or downward at the rear wheel when the brake is applied. One solution would be to use a larger diameter (and therefore stiffer) bolt. However, the 6 mm hole is in the fork crown (probably the most highly stressed part on a bicycle), and any significant enlargement of this hole would weaken the fork crown. At the rear the thin, lightweight brake bridge is so small that even a 6 mm hole removes more than half the cross-section of said brake bridge, and any significant increase in hole size would further weaken an already delicate member.

SUMMARY OF THE INVENTION

The device embodying the present invention includes a mounting post that vastly increases the stiffness of the caliper arms' mounting method and at the same time allows about eight times as much bearing area, all without any significant alteration or weakening of any part of the bicycle. Additionally, it will fit on any standard bicycle, made anywhere in the world.

The mounting post has an enlarged rear face, of about ¾ inch diameter in a preferred embodiment, or the largest diameter that can fit against a fork crown without interfering with the lower bearing cup on the headset. The brake mounting bolt will be threaded into the mounting post and will pull the post enlarged rear face firmly against the fork crown so that it is very resistant to upward tilting. A coved or cylindrically-faced adaptor bushing will fit the mounting post firmly against fork crowns that have cylindrical front faces.

The bulk or mass of the mounting post will be added to that of the mounting bolt, so that their combined stiffness is many times that of a 6 mm bolt alone.

Additionally, the mounting post can have a diameter far greater than 6 mm, because it does not penetrate the supporting member (fork crown or rear brake bridge), and therefore it can provide a far greater pivot bearing area.

At the rear of the bicycle, because the brake bridge does not usually offer a strong or stable mounting base, there is a seat stay adaptor means which transfers the braking stresses from the brake bridge to the seat stays. This adaptor can be in back of the brake bridge, with its arms projecting downward and outward to rest against the seat stays, or it can be in front of the brake bridge, with its arms projecting upward and outward, also resting against the seat stays.

Because many bicycles are made with oversized 6 mm mounting bolt holes, this device can be offered with ¼" mounting bolts, and with instructions to try it for fit first, and if it will not go through a hole, to drill out the hole to exactly ¼". The maximum increase in hole size would be 14/1,000ths", which could not significantly weaken the member that it pierces.

OBJECTS OF THE INVENTION

It is the main object of the present invention to provide a sturdy, yet efficient, brake mechanism for a bicycle.

It is another object of the present invention to provide a simple, easily assembled brake mechanism for a bicycle which is rigid and efficient.

It is yet another object of the present invention to provide a mechanism for a bicycle brake which is easily installed on existing equipment to increase the rigidity of such existing bicycle brakes.

It is still another object of the present invention to provide a bicycle brake mechanism which can be installed without significantly weakening any part of an existing bicycle.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a front elevation view of a mechanism embodying the teachings of the present invention.

FIG. 2 is a side elevation of the mechanism embodying the teachings of the present invention.

FIG. 3 is a view taken along line 3—3 of FIG. 1.

FIG. 4 is a view taken along line 4—4 of FIG. 3.

FIG. 5 is an exploded perspective of the mechanism embodying the teachings of the present invention.

FIG. 7 is a front view of the FIG. 6 embodiment of the mechanism.

FIG. 8 is a perspective of an alternative mounting means for the mechanism shown in FIGS. 6 and 7.

DETAILED DESCRIPTION OF THE INVENTION

Figure 6:
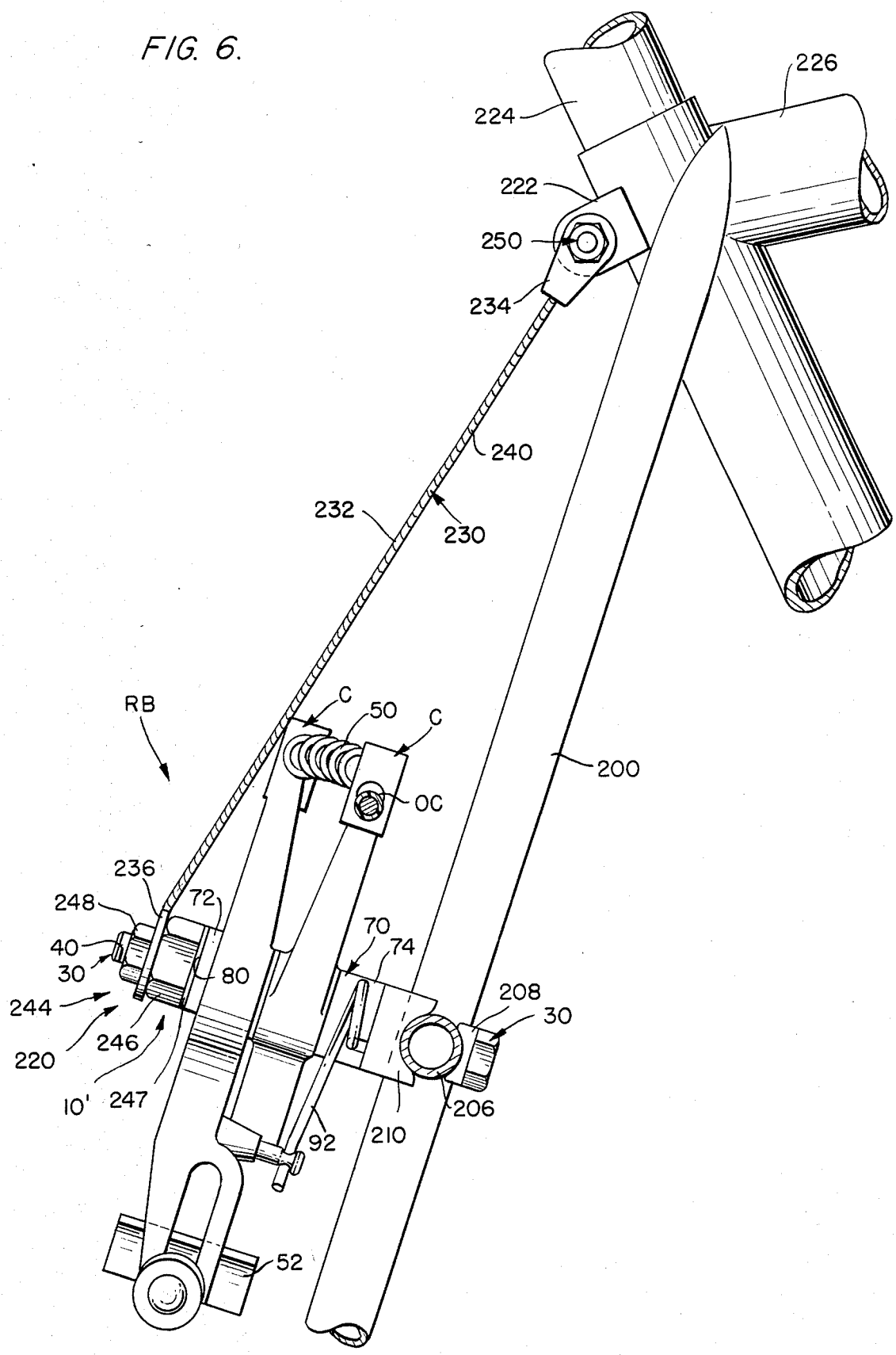
FIG. 6 is a side elevation view of an alternative embodiment of the mechanism embodying the teachings of the present invention.

Shown in FIGS. 1–5 is a mechanism 10 for increasing the rigidity and efficiency of a bicycle braking means B. The mechanism 10 is attached to front frame 12 of a bicycle and includes brake means 20 similar to that disclosed in *DeLong's Guide to Bicycles and Bicycling*, on pages 114 and 117. The disclosure of these pages is incorporated herein by reference thereto.

The brake means B is mounted on the crown fork 24 of the bicycle and includes a mounting bolt 30 having a trunk section 32 which extends through bore 34 of the crown fork 24 and has a head 38 on one end thereof and screw threads 40 on the other end thereof. A washer 42 and a nut 44 attach the bolt to the crown fork.

A caliper spring 50 is mounted on caliper arms C, as are brake pad means 52. As can best be seen in FIG. 2, the caliper arms C are upright with respect to the caliper arms shown in the afore-referenced *DeLong's Guide*.

As discussed above, the mounting bolt 30 tends to flex when braking pressure is applied via operating cable OC.

The mechanism 10 substantially increases the rigidity of the brake means B without requiring additional penetration into any part of the bicycle frame, or without detracting from the assembly efficiency of the overall brake means B.

The mechanism 10 includes an abutting means, such as washer 60 located adjacent to front surface 62 of the crown fork. A mounting post 70 abuts one face of the abutting means and includes a trunk section 72 with a head section 74 on one end thereof and external screw threads 76 on the other end thereof. A bore 78 extends longitudinally through the mounting post from front end 80 of the trunk to end 82 of the head section.

A counterbore 84 is defined in the head section adjacent to the longitudinal bore 78 and extends from end 80 of the head section to the outer face 86 of that head section. Rear face 88 of the bore 84 is sloped from the end 82 to a cylindrical portion 89 of that bore. A third bore 90 accommodates a spring 92 of the caliper mechanism. Screw threads 94 are defined internally of the bore 78 adjacent to and extending from end 80 of the post. The threads 94 cooperate with threads 40 of the mounting bolt to attach the post 70 to the mounting bolt.

A cap 100 has a crown section 102, a skirt 104 and a bore 106 defined therein. The screw threads 108 and 110 cooperate with screw threads 40 of the mounting bolt and screw threads 76 of the mounting post, respectively, to further attach the mounting post and caliper arms to the mounting bolt and bicycle frame.

The washer 60 can have planar faces or can be coved as necessary to properly seat on the front face of the crown fork. As shown in FIG. 5, the rear washer 42 can also be coved as necessary.

The caliper arms are pivotally mounted on the mounting post between the cap 100 and the head section 74. The head section has a transverse cross-sectional area which is larger than that of the trunk section, so that a shoulder 16 is defined at the intersection of these two sections. An undercut 118 is defined around the shoulder to assure a square corner and a planar face 120 of the shoulder. The caliper arms abut the shoulder face 120 to be held in proper position on the mounting post.

As discussed above, the size of the mounting bolt 30 is limited due to the requirement that such bolt penetrate through the bicycle frame part on which it is mounted. The addition of the mounting post 70 which is securely held in position against the frame part greatly increases the rigidity of the overall mechanism. The increase in mass and surface area created by the post 70 increases the rigidity of the brake means. In fact, due to the forces created on the post and bolt via the cap and interlocking screw threads, the overall increase in rigidity of the brake means exceeds that added because of the mere increase in mass and surface area due to the addition of the mounting post. The engagement of the screw threads 110 and 76 prevent binding of the caliper arms. The mounting bolt thus synergistically increases the rigidity of the overall brake means without significantly increasing the problems of manufacture or assembly of the brake means on new or existing bicycles.

Shown in FIGS. 6 and 7 is a rear brake means RB utilizing a rigidity increasing mechanism 10′. The mechanism 10′ is similar to the just-described mechanism 10; however, the mechanism 10 is modified to be mounted on seat stays 200 of the bicycle. Otherwise, the mechanism 10′ is similar to the mechanism 10 and includes a mounting post 70 surrounding the mounting bolt 30 which is inserted through a bicycle frame element 206 and is held thereon using a washer 208 and a coved adaptor 210. Caliper arms C are pivotally mounted on the post 70 and include springs 50 and 92 as above disclosed. The mounting post includes a trunk section 72 and a head section 74, also as above described.

A mounting means 220 includes a mounting bracket 222 attached to seat post 224 adjacent to bicycle top tube 226. A brace rod 230 includes an elongate body 232 having a yoke 234 at one end thereof and a mounting collar 236 at the other end thereof. The yoke is threadably attached to the rod via screw threads 240 defined on the rod so that the length of the rod between the brake means and the bracket 222 can be adjusted.

The mounting collar is attached to the mounting post by a nut means 244 which includes a washer 247 located in abutting relationship with end 80 of the mounting post, and first and second nuts 246 and 248, respectively, which sandwich the collar therebetween.

The brace rod 230 extends between the caliper arms C as shown in FIG. 7. Preferably, the rod acts as a tension rod and has a substantial portion thereof covered by the screw threads 240. The yoke is attached to the mounting bracket by a clevis bolt 250, and the full length of the rod 230 is used in tall bicycles; whereas, short bicycles only use some of that length. Extra length of the rod can be cut off as suitable during installation.

Shown in FIG. 8 is a mounting means 300 for mounting the mechanism 10′ to seat stays 200. The mounting means 300 includes a one-piece adaptor or brace 302 mounted on a brake bridge 304 which extends between the stays 200. The mounting means brace 302 includes a central body 306 attached to the bridge 304 and outwardly extending wings 308 which are integral with the body 306 and which are attached to the stays 200. A bore 310 receives head section 74 of the post 70, and a central bore 312 receives mounting bolt 30.

The bolt 30 extends through the bore 312 and then through the bore 78 of the post 70 to be threadably attached to screw threads 94 of the post. A cap or a brace rod can be attached to the bolt 30 so that the post 70 is captured between the brace 302 and the cap or brace rod with the brace 302 being interposed between the head 38 of the bolt 30 and the head 74 of the post 70.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An improvement in a bicycle brake of the type having a caliper means, a mounting bolt attaching the caliper means to a bicycle frame, the improvement comprising:
   an adaptor means abutting the bicycle frame and having a bore defined therethrough through which the mounting bolt extends; and
   a mounting post having a trunk section and a head section, said head section abutting said adaptor means and being larger in cross-sectional area than said trunk section, said trunk section and said head section having a bore defined therethrough through which the mounting bolt extends, sdid trunk section having caliper mounting means thereon for attaching the caliper means to said mounting post and mounting bolt attaching means for attaching said mounting post to the mounting bolt, further including means attaching said mounting post to seat stays of the bicycle, together with adjustable means for bracing said mounting post including a brace rod attaching the trunk section of said mounting post to a seat post of the bicycle.

2. The improvement defined in claim 1 wherein said brace rod includes external screw threads and a yoke attaching said brace rod to the seat post, said yoke including screw threads receiving said brace rod screw threads.

3. The improvement defined in claim 1 further including a spacer means located on said mounting post between the caliper means and a mounting collar for said brace rod.

4. A brake device for a bicycle comprising:
   braking means for the bicycle wheel including a pair of caliper arms;
   a mounting post for pivotably supporting said caliper arms thereon, the mounting post having a central bore completely therethrough;
   retaining means at one end of said mounting post for removably holding said caliper arms thereon;
   a mounting bolt for affixing said mounting post to a bicycle frame, one end of said bolt being associated with said retaining means;
   adaptor means for abutting the bicycle frame which has an aperture therethrough through which said mounting bolt extends;
   said one end of said mounting bolt which is associated with said retaining means having screw threads thereon for engagement with complementary internal screw threads within the central bore of said mounting post;
   said retaining means including further external screw threads defined on the mounting post;
   bridge means attaching said mounting post to seat stays of the bicycle;
   said bridge means including a brake bridge together with a separate one-piece brace with wings mounted on the seat stays of the bicycle, said mounting post being mounted on said brace; and
   a one-piece brace rod extending from a seat post clamp of the bicycle to the outboard or unsupported end of the mounting post, to compensate for the weakness and flexibility of the brake bridge and the supporting seat stays.

5. The brake device defined in claim 4 wherein the one-piece brace rod extends from the seat post clamp of the bicycle to the outboard or unsupported end of the mounting post, to compensate for the weakness and flexibility of the bridge means and the supporting seat stays.

6. The brake device defined in claim 5 wherein said brace rod has external screw threads thereon and an adjustable yoke attaches said brace rod to the seat post clamp, said yoke including female threads for receiving said brace rod screw threads.

* * * * *